Oct. 21, 1958 R. L. FRANK ET AL 2,857,594

AUTOMATIC GAIN LIMITING SYSTEM FOR LORAN RECEIVERS

Filed Nov. 14, 1955

INVENTORS
ROBERT L. FRANK
EDWARD DURBIN
WALTER N. DEAN
BY R. J. Craddock
ATTORNEY United States Patent Office 2,857,594
Patented Oct. 21, 1958

2,857,594

AUTOMATIC GAIN LIMITING SYSTEM FOR LORAN RECEIVERS

Robert L. Frank, Great Neck, Edward Durbin, Valley Stream, and Walter N. Dean, Garden City, N. Y., assignors to Sperry Rand Corporation, a corporation of Delaware Application November 14, 1955, Serial No. 546,625
13 Claims. (Cl. 343—103)

Figures 1, 2, 3A, 3B:
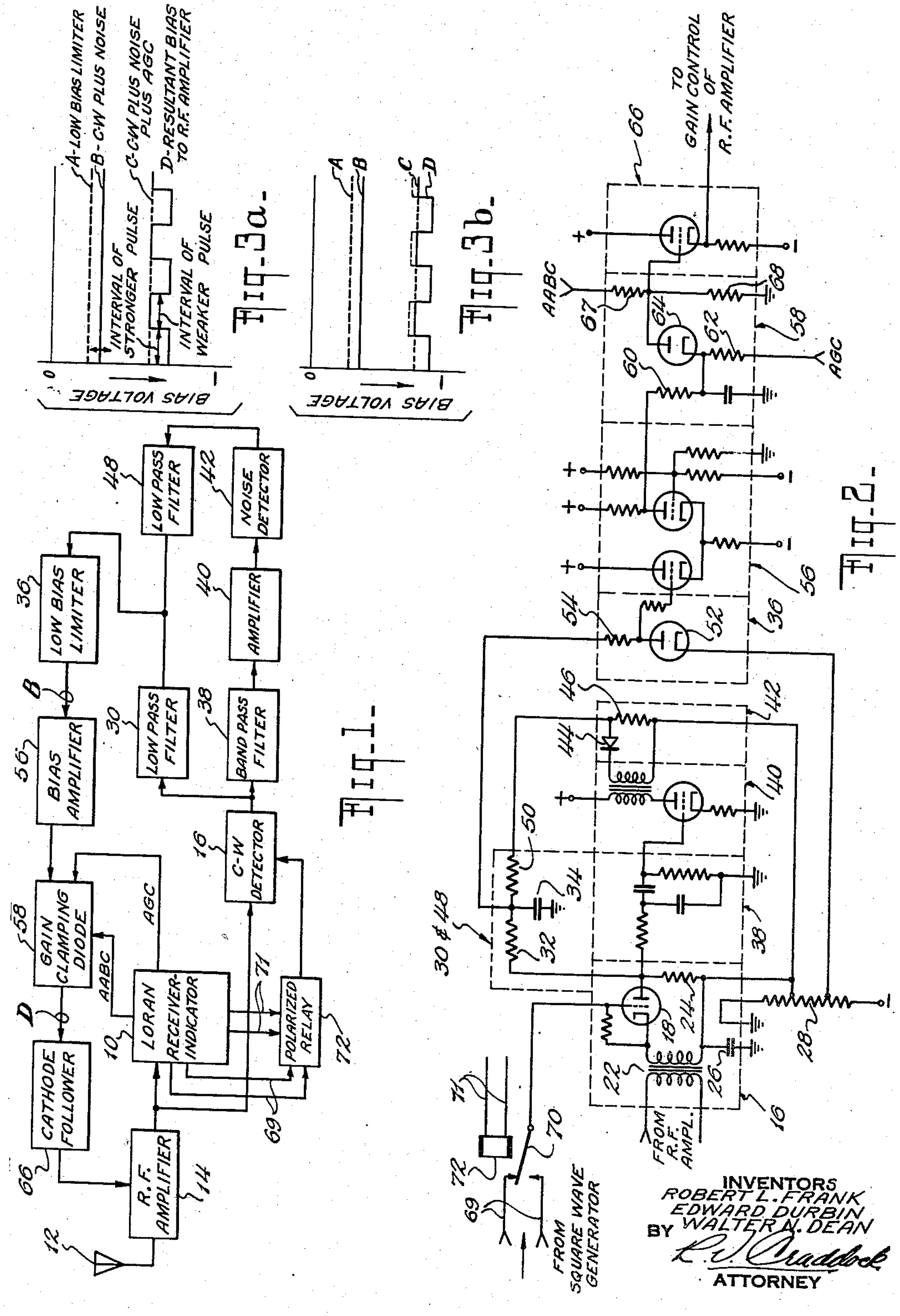

This invention relates to hyperbolic navigation receivers, and more particularly, is concerned with automatically limiting gain in the presence of noise and unwanted C. W. signals.

It is well known that in the operation of receivers in the presence of strong interference, it is desirable to reduce the gain to prevent saturation of the amplifiers. Reduction of gain under such circumstances provides improved discrimination of the desired signal over the interference. It has been a general practice in loran receivers to provide a manual gain control by means of which the operator can reduce the gain in the presence of strong interference. However, in automatic navigation control systems, it is desirable that means be provided for automatically limiting the gain in the presence of strong interference. Automatic gain limiting in loran receivers is complicated by the fact that by the nature of the receiver's operation, it is more sensitive to persistent interference of a random noise type than of a continuous wave type.

It is therefore a general object of this invention to provide a receiver in which the gain is automatically limited in the presence of strong interference to extend the dynamic range of the receiver.

Another object of this invention is the provision of an automatic gain limiting system for a loran receiver in which persistent noise interference is emphasized over persistent continuous wave interference in limiting the gain.

Another object of this invention is to provide automatic gain limiting means in the receiver of a time sharing transmission system in which noise and C. W. interference are measured only during the time sharing interval when the receiver is most susceptible to interference signals, namely, during the reception of the weaker of the time sharing signals.

These and other objects of the invention which will become apparent as the description proceeds are achieved by providing a pulse hyperbolic navigation receiver which includes a signal amplifier, and a first detector coupled to the output of the amplifier for detecting continuous wave interfering signals and noise present in the amplifier output. The output of the first detector is amplified, passed through a band-pass filter, which substantially eliminates the D. C. component produced by the interfering continuous wave signals, and then coupled to a second detector for detecting substantially only the noise modulation present in the output signal of the first detector. Means including low-pass filters combine the outputs of the first and second detectors for producing a bias voltage varying in magnitude in response to the persistence of the continuous wave interfering signals and the persistence of the noise signals are emphasized by the amplifier between the first and second detectors. The combined bias voltage is coupled to a low-bias limiter which produces a minimum bias voltage in the absence of interfering continuous wave and noise signals. The output of the bias limiter is utilized to control the gain of the signal amplifier. The first detector is gated only during the time interval corresponding to the interval of the weaker of the received master and slave loran pulses.

For a better understanding of the invention, reference should be had to the accompanying drawing, wherein, Fig. 1 is a block diagram of the automatic gain limiting system in conjunction with a loran receiver;

Fig. 2 is a schematic wiring diagram of the gain limiting circuit; and

Figs. 3*a* and *b* show a series of voltage curves used in explaining the operation of the invention.

In the drawings, the numeral 10 indicates generally a loran receiver-indicator of a type such as described in Patent No. 2,651,033, issued September 1, 1953, in the name of Wilbert P. Frantz. Incoming signals are fed to the loran receiver-indicator through an antenna 12 and R. F. amplifier 14, the latter preferably including several tuned amplifier stages. The output of the R. F. amplifier 14 is also coupled to a C. W. gated detector 16. The detector 16, as shown in Fig. 2, includes a triode 18 used as a grid controlled detector. A gating voltage derived from the receiver-indicator 10 is applied to the grid of the triode 18, in a manner hereinafter more fully explained.

If there is interference present in the form of a continuous wave jamming signal, for example, such C. W. signal, coupled to the detector circuit 16 through a transformer 22, produces a half wave rectified D. C. voltage across a resistor 24 connected in series with the plate of the detector tube 18. As is well understood in the art, the magnitude of the D. C. component of said rectified voltage is proportional to the persistence of the interfering C. W. signal, i. e., a C. W. signal of short-time duration such as, for example, the desired loran pulsed signal will negligibly contribute to the total rectified D. C. voltage. The detector circuit is effectively held at ground for A. C. signals by a bypass condenser 26, the D. C. level of the detector output being established by a connection from one end of the resistor 24 to a bias potentiometer 28.

The half-wave rectified output signal produced across the resistor 24 of the C. W. detector 16 is coupled to a low-pass filter 30, which, as shown in Fig. 2, includes a resistor 32 and condenser 34 to provide a filtered D. C. bias voltage varying with amplitude changes of persistent C. W. signals such as the C. W. jamming signal.

The output of the C. W. detector 16 is also coupled to a band-pass filter 38, which, as shown in Fig. 2, comprises an R-C network designed to pass frequencies substantially less than the carrier frequency but blocking D. C. voltages, as well as low frequency components in the output of the detector 16. The output signal of the band-pass filter 38 is an A. C. signal modulated in amplitude by substantially only the random noise present in the received signal and amplified by the R. F. amplifier 14. This noise modulated signal is amplified by a single stage amplifier 40 and applied to a noise detector 42. The detector 42 includes a crystal diode 44 and a load resistor 46, the D. C. bias level of the detector circuit being set by the potentiometer 28 in the same manner as the C. W. detector 16. The output of the noise detector 42 is a half-wave rectified voltage appearing across the resistor 46 which varies in magnitude according to changes in the amplitude variations of the noise component of the received signal.

The output of the noise detector 42 is coupled to a low-pass filter 48 including a resistor 50 and the capacitor 34, which is also common to the low-pass filter 30. Thus, the potential appearing across the capacitor 34 depends upon the amplitude of any interfering C. W. signals, plus noise signals as emphasized by the amplifier 40. The larger the magnitude of either the C. W. or noise signals, the larger the negative potential appearing across the capacitor 34. It will be clear to those skilled in the art that low pass filters 30 and 48, in passing only low frequency components including D. C., substantially eliminate any possible contribution to the total potential across capacitor 34 by received signals of low duty cycle such as for example the desired loran pulsed signals.

The potential appearing across the capacitor 34 is applied to a low-bias limiter 36 which comprises a conventional diode clamping circuit including a diode 52, the cathode of which is connected to a negative potential derived from the potentiometer 28. The plate of the diode 52 is connected through a resistor 54 to the capacitor 34. It will be seen that if the potential across the capacitor 34 becomes more positive than the bias fixed on the cathode of the diode 52, a voltage drop will develop across the resistor 54 due to conduction of the diode 52. Thus the plate of the diode 52 is held substantially at the potential as set by the voltage divider 28. However, if the voltage scross the condenser 34 goes negative with respect to the potential set by the voltage divider 28, the diode 52 will be cut off and the plate will assume whatever potential appears at the capacitor 34. Thus, the plate of the diode 52 is limited in a positive going direction to the potential set at the voltage divider 28.

The output from the low-bias limiter 36, as derived from the plate of the diode 52, is coupled to the input of a bias amplifier 56, which is shown in Fig. 2 as a conventional cathode-coupled type of D. C. amplifier.

The output from the bias amplifier 56, referred to hereinafter as the interference bias voltage, is coupled to a gain clamping diode circuit 58 where it is added to the automatic gain control bias voltage (AGC) derived from the loran receiver-indicator 10. The latter bias voltage (appearing at the output of the cathode follower 143 in the Frantz patent receiver) is developed in response to the amplitude of the weaker of the master and slave loran pulses, in the manner particularly described in the above-identified patent of Frantz. The two bias voltages are added respectively through resistors 60 and 62 to the cathode of a limiter diode 64, and thus the sum of these two bias voltages sets the clamping level of the gain clamping diode circuit 58.

Connected to the plate of the clamping diode 64 is the automatic amplitude balance control voltage (AABC) as derived from the loran receiver-indicator 10. The AABC voltage (appearing at the output of the amplitude balance restorer 24 of the Frantz patent receiver) has a wave shape corresponding to a rectangular wave in which successive half cycles correspond to the respective intervals in which master and slave loran pulses are received. As taught in the above-identified Frantz patent, the less negative half cycle of the AABC voltage is clamped by a D. C. restorer circuit to the AGC voltage as determined by the weaker of the two received pulses, whereas the more negative half cycle of the AABC voltage is determined by the stronger of the received loran pulses. It will be seen that in the gain clamping diode circuit 58, as shown in Fig. 2, the potential in the cathode of the clamping diode 64 is made proportional to the sum of the interference bias voltage and the AGC bias voltage. This establishes the clamping level on the plate circuit of the clamping diode 64, so that if the AABC voltage tends to push the plate positive with respect to the potential in the cathode of the clamping diode, the diode begins to conduct and thus prevents the plate potential from rising further. The result is that the less negative portion of the AABC voltage, corresponding to the interval of the weaker signal, may be clamped at a more negative level as set by the sum of the interference bias voltage and the AGC bias voltage. Resistors 67 and 68 attenuate the AABC voltage to compensate for the attenuation of the AGC voltage by the resistors 62 and 60.

The output of the gain clamping diode circuit 58, as derived from the plate of the clamping diode 64, is coupled to a cathode follower circuit 66, which in turn is coupled to the control grids of the several stages of the R. F. amplifier 14 for controlling the bias and hence the gain of the several stages of the amplifier 14.

The operation of the circuit as thus far described, may be summarized as follows. A minimum vias voltage, corresponding to the maximum desired gain of the R. F. amplifier, is set by the low-bias limiter 36. This voltage level is shown in the waveforms of Figs. 3*a* and 3*b* as a dotted line A. If an interfering continuous wave signal or noise interference, or both, are present in the output of the R. F. amplifier 14, a voltage is produced at the output of the low-pass filters 30 and 48, which is more negative than the minimum level set by the low-bias limiter, resulting in a more negative bias and reducing the gain of the amplifier 14 accordingly. This is shown by the solid line B of Fig. 3.

Added to the bias voltage derived from the low-bias limiter 36 is the AGC bias from the loran receiver-indicator 10. This bias voltage varies with the amplitude of the weaker of the received master and slave pulse signals, and thus acts to vary the gain of the R. F. amplifier 14 in response to the strength of the received signals. The resulting bias produced by the sum of the C. W. signal plus noise, plus the AGC voltage, is shown by the solid line C of Fig. 3. This resulting bias voltage is compared with the AABC signal. The latter signal is rectangular in shape as shown by the rectangular wave D of Fig. 3 and is utilized to vary the gain of the amplifier 14 during successive intervals so as to bring the weaker and stronger of the received master and slave pulses to the same output level. However, by virtue of the clamping diode 58, the gain of the amplifier 14 can never be increased above the level set by the bias voltage established in response to the interference bias voltage plus AGC voltage.

In other words, in the absence of continuous wave or noise interference, in the conventional loran receiver-indicator of the type disclosed in the above-identified Frantz patent, the gain of the amplifier is controlled in response to the automatic gain control to bring the amplitude of the weaker of the received pulses up to a predetermined level. By virtue of the AABC voltage, the gain is reduced during the interval that the stronger pulse is received, thus bringing both the weak and strong pulses to the same predetermined level at the output of the amplifier. By virtue of the present invention, in the presence of C. W. and noise interference, the gain of the R. F. amplifier is further reduced for moderate interference levels during the interval in which the weaker pulse is being received, and for larger interference levels, during both signal intervals. Thus overloading of the loran receiver-indicator circuits is prevented, making the signal pulses more easily distinguished above the C. W. and noise interference.

Since the R. F. amplifier 14 is operated on a time sharing basis for the received master and slave loran pulses, it is desirable that the C.-W. detector 16 be gated on only during the receiving interval wherein the receiver gain is highest to maintain constant circuit sensitivity to interference. This is accomplished by coupling a square wave to the grid of the gated detector 16 that is positive going during the time sharing interval of the weaker of the master and slave pulses. In the loran receiver as described in the above-identified Frantz patent is a square wave generator, indicated at 51 in the Frantz patent, which establishes the time sharing intervals. Two square wave output signals of opposite phase are derived through the leads 69 from the generator and selectively applied through a switch 70 to the grid of the detector tube 18. The switch is part of a polarized relay 72 connected by the leads 71 between the output signals from a pair of cathode followers, indicated in the above-identified Frantz patent as 139 and 140, in the automatic amplitude balance circuit of the loran receiver 10. Thus one phase or the other of the square wave is applied to the detector depending on which time sharing interval corresponds to the weaker of the received master and slave pulses, so that noise and C.-W. interference are measured only during the interval when the receiver is more susceptible to interfering signals, namely, the interval in which the receiver gain is highest.

From the above description it will be seen that the various objects of the invention have been achieved by the provision of a loran receiver circuit in which the gain is controlled in response to C.-W. and noise interference present in the receiver. It is to be understood that the invention is not limited to a system having two time sharing intervals, but could be utilized in systems having more or less time sharing intervals and corresponding received pulses. While the emphasis of noise interference by the amplifier between detectors has been shown, noise emphasis by way of attenuation of the C.-W. interference may be utilized.

Since many changes could be made in the above construction and many apparently widely different embodiments of this invention could be made without departing from the scope thereof, it is intended that all matter contained in the above description or shown in the accompanying drawings shall be interpreted as illustrative and not in a limiting sense.

What is claimed is:

1. A pulse hyperbolic navigation system in which pulses are successively received from a master station and at least one slave station at a predetermined repetition frequency, comprising a variable gain signal amplifier, a first detector coupled to the output of said amplifier, means including a band-pass filter for amplifying the output of said first detector within a selected frequency range, a second detector coupled to the amplified output of the first detector, means for combining the output of the first and second detectors for producing negative bias voltage, bias limiting means coupled to the output of said combining means for producing a minimum bias voltage in the absence of detected signals from the first and second detectors, means for adding to the output of said bias limiting means a negative voltage, the magnitude of the negative direction of which is determined by the amplitude of the weaker of said master or slave pulses, means for deriving a rectangular wave voltage, the magnitude during the less negative half cycle being determined by the amplitude of the weaker of said master or slave pulses and the magnitude during the more negative half cycle being determined by the amplitude of the stronger of said master or slave pulses, and a clipping circuit coupling said rectangular wave to said amplifier for controlling the gain thereof, the voltage derived from said means for adding the bias limiter voltage and the weak signal voltage being coupled to the clipping circuit for limiting the less negative voltage of the rectangular wave in response thereto, whereby the maximum gain of said amplifier is limited in response to the magnitude of the output of the first and second detectors.

2. Apparatus as defined in claim 1 further including means for gating said first detector on and off, said means including means for gating the detector on during the less negative half cycle of said rectangular wave voltage, whereby the detector is gated on only during the interval of the weaker of the received slave and master pulses.

3. A hyperbolic navigation receiver adapted to receive master and slave pulses during successive time sharing intervals, the receiver comprising an amplifier for amplifying the received pulses including means for controlling the gain thereof in response to an applied bias voltage, means for producing a negative voltage which changes level during successive time sharing intervals according to changes in the relative strength of the received pulses as determined by the relative distances to the respective sources of said pulses from the receiver, said last-named means being coupled to the bias control of the amplifier to vary the gain of the amplifier during successive time sharing intervals, the gain being maximum during the interval of the weaker received pulses, a first detector coupled to the output of the amplifier, means for gating the first detector on during the time sharing interval of the weaker pulses, a second detector coupled to the output of the first detector, means for producing a negative voltage that varies in amplitude according to changes in amplitude of the weaker of the received pulses as determined by the relative distances to the respective sources of said pulses, means for producing a bias voltage proportional to the magnitude of the sum of the output of said last-named means, the first detector and the second detector, and clamping means coupled to the bias control of said amplifier and responsive to said summing means for limiting the maximum gain of the amplifier during any of the time sharing intervals in response to the magnitude of the output voltage of said summing means.

4. A hyperbolic navigation receiver adapted to receive master and slave pulses during successive time sharing intervals, the receiver comprising an amplifier for amplifying the received pulses including means for controlling the gain thereof in response to an applied bias voltage, means for producing a negative voltage which changes level during successive time sharing intervals according to changes in the relative strength of the received pulses as determined by the relative distances to the respective sources of said pulses from the receiver, said last-named means being coupled to the bias control of the amplifier to vary the gain of the amplifier during successive time sharing intervals, the gain being maximum during the interval of the weaker received pulses, a first detector coupled to the output of the amplifier, a second detector coupled to the output of the first detector, means for producing a negative voltage that varies in amplitude according to changes in amplitude of the weaker of the received pulses as determined by the relative distances to the respective sources of said pulses, means for producing a bias voltage proportional to the magnitude of the sum of the output of said last-named means, the first detector and the second detector, and clamping means coupled to the bias control of said amplifier and responsive to said summing means for limiting the maximum gain of the amplifier during any of the time sharing intervals in response to the magnitude of the output voltage of said summing means.

5. A hyperbolic navigation receiver adapted to receive master and slave pulses during successive time sharing intervals, the receiver comprising an amplifier for amplifying the received pulses including means for controlling the gain thereof in response to an applied bias voltage, a first detector coupled to the output of the amplifier, a second detector coupled to the output of the first detector, means for producing a negative voltage that varies in amplitude according to changes in amplitude of the weaker of the received pulses as determined by the relative distances to the respective sources of said pulses, means for producing a bias voltage proportional to the magnitude of the sum of the output of said last-named means, the first detector and the second detector, and clamping means coupled to the bias control of said amplifier and responsive to said summing means for limiting the maximum gain of the amplifier during any of the time sharing intervals in response to the magnitude of the output voltage of said summing means.

6. A hyperbolic navigation receiver adapted to receive master and slave pulses during successive time sharing intervals, the receiver comprising an amplifier for amplifying the received pulses including means for controlling the gain thereof in response to an applied bias voltage, means for producing a negative voltage which changes level during successive time sharing intervals according to changes in the relative strength of the received pulses as determined by the relative distances to the respective sources of said pulses from the receiver, said last-named means being coupled to the bias control of the amplifier to vary the gain of the amplifier during successive time sharing intervals, the gain being maximum during the interval of the weaker received pulses, a first detector coupled to the output of the amplifier, means for gating the first detector on during the time sharing interval of the weaker pulses, a second detector coupled to the output of the first detector, means for producing a bias voltage proportional to the magnitude of the sum of the output of the first detector and the second detector, and clamping means coupled to the bias control of said amplifier and responsive to said summing means for limiting the maximum gain of the amplifier during any of the time sharing intervals in response to the magnitude of the output voltage of said summing means.

7. A hyperbolic navigation receiver adapted to receive master and slave pulses during successive time sharing intervals, the receiver comprising an amplifier for amplifying the received pulses including means for controlling the gain thereof in response to an applied bias voltage, means for producing a negative voltage which changes level during successive time sharing intervals according to changes in the relative strength of the received pulses as determined by the relative distances to the respective sources of said pulses from the receiver, said last-named means being coupled to the bias control of the amplifier to vary the gain of the amplifier during successive time sharing intervals, the gain being maximum during the interval of the weaker received pulses, a first detector coupled to the output of the amplifier, a second detector coupled to the output of the first detector, means for producing a bias voltage proportional to the magnitude of the sum of the output of the first detector and the second detector, and clamping means coupled to the bias control of said amplifier and responsive to said summing means for limiting the maximum gain of the amplifier during any of the time sharing intervals in response to the magnitude of the output voltage of said summing means.

8. A hyperbolic navigation receiver adapted to receive master and slave pulses during successive time sharing intervals, the receiver comprising an amplifier for amplifying the received pulses including means for controlling the gain thereof in response to an applied bias voltage, a first detector coupled to the output of the amplifier, a second detector coupled to the output of the first detector, means for producing a bias voltage proportional to the magnitude of the sum of the output of the first detector and the second detector, and clamping means coupled to the bias control of said amplifier and responsive to said summing means for limiting the maximum gain of the amplifier during any of the time sharing intervals in response to the magnitude of the output voltage of said summing means.

9. A pulse hyperbolic navigation receiver comprising a signal amplifier including means for varying the gain thereof in response to a variable bias voltage, a first detector coupled to the output of the amplifier for detecting continuous wave signals and noise present in the amplifier output, an amplifier coupled to the output of the first detector, a second detector coupled to the amplified output of the first detector for detecting noise modulation present in the output of the first detector, means including low-pass filters for combining the outputs of the first and second detectors for producing a bias voltage varying in magnitude in response to the continuous wave signals and the emphasized noise, low bias limiter means coupled to the output of said combining means for producing a minimum bias voltage in the absence of continuous wave and noise signals, and means for coupling the output of the bias limiter means to the gain controlling means of said signal amplifier for controlling the maximum gain of the signal amplifier in response to said bias voltage.

10. A receiver comprising a signal amplifier including means for varying the gain thereof in response to a variable bias voltage, a first detector coupled to the output of the amplifier for detecting interfering continuous wave signals and noise present in the amplifier output, a second detector coupled to the output of the first detector for detecting substantially only the noise modulation present in the output of the first detector, means for combining the outputs of the first and second detectors for producing a bias voltage varying in magnitude in response thereto, low bias limiter means coupled to the output of said combining means for producing a minimum bias voltage in the absence of interfering continuous wave and noise signals, and means for coupling the output of the bias limiter means to the gain controlling means of said signal amplifier for controlling the maximum gain of the signal amplifier in response to said bias voltage.

11. A receiver comprising a signal amplifier including means for varying the gain thereof in response to a variable bias voltage, a first detector coupled to the output of the amplifier, a second detector coupled to the output of the first detector for detecting substantially only the modulation present in the output of the first detector, means including low-pass filters for combining the outputs of the first and second detectors for producing a bias voltage varying in magnitude in response thereto, and means for coupling said bias voltage to the gain controlling means of said signal amplifier for controlling the maximum gain of the signal amplifier in response to said bias voltage whereby said modulation is emphasized in controlling said maximum gain.

12. A receiver comprising a signal amplifier including means for varying the gain thereof in response to a variable bias voltage, a first detector coupled to the output of the amplifier for detecting interfering continuous wave signals and noise present in the amplifier output, a second detector coupled to the output of the first detector for detecting substantially only the noise modulation present in the output of the first detector, means responsive to the outputs of the first and second detectors for producing a bias voltage varying in magnitude in response thereto, and means for applying said bias voltage to the gain controlling means of said signal amplifier for controlling the maximum gain of the signal amplifier in response to said bias voltage whereby said noise modulation is emphasized over said interfering continuous wave signals in controlling said maximum gain.

13. A receiver comprising a signal amplifier including means for varying the gain thereof in response to a variable bias voltage, a first detector coupled to the output of the amplifier for detecting interfering continuous wave signals and noise present in the amplifier output, a second detector, means including a band-pass filter for coupling the second detector to the output of the first detector for detecting substantially only the noise modulation present in the output of the first detector, means including low-pass filters for combining the outputs of the first and second detectors for producing a bias voltage varying in magnitude in response to the interfering continuous wave signals and the noise, low bias limiter means coupled to the output of said combining means for producing a minimum bias voltage in the absence of interfering continuous wave and noise signals, and means for coupling the output of the bias limiter means to the gain controlling means of said signal amplifier for controlling the maximum gain of the signal amplifier in response to said bias voltage.

References Cited in the file of this patent

UNITED STATES PATENTS 2,743,355 Sink ------------------ Apr. 24, 1956